Jan. 4, 1938.  C. G. BIRO  2,104,360
MEAT CUTTING AND SLICING MACHINE
Original Filed Feb. 27, 1936  2 Sheets-Sheet 1
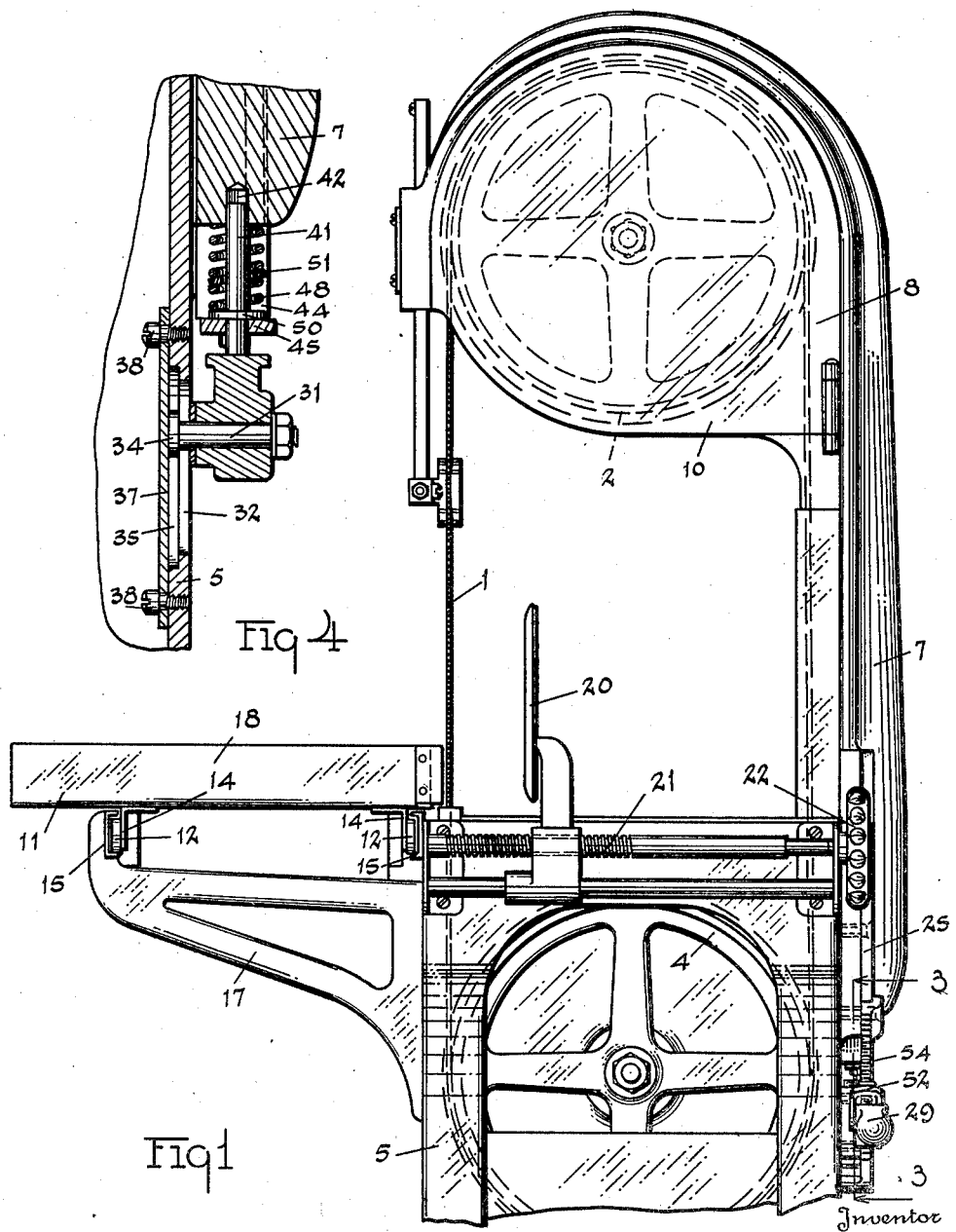
Inventor
Carl G. Biro
By
Attorney Jan. 4, 1938.  C. G. BIRO  2,104,360
MEAT CUTTING AND SLICING MACHINE
Original Filed Feb. 27, 1936   2 Sheets-Sheet 2
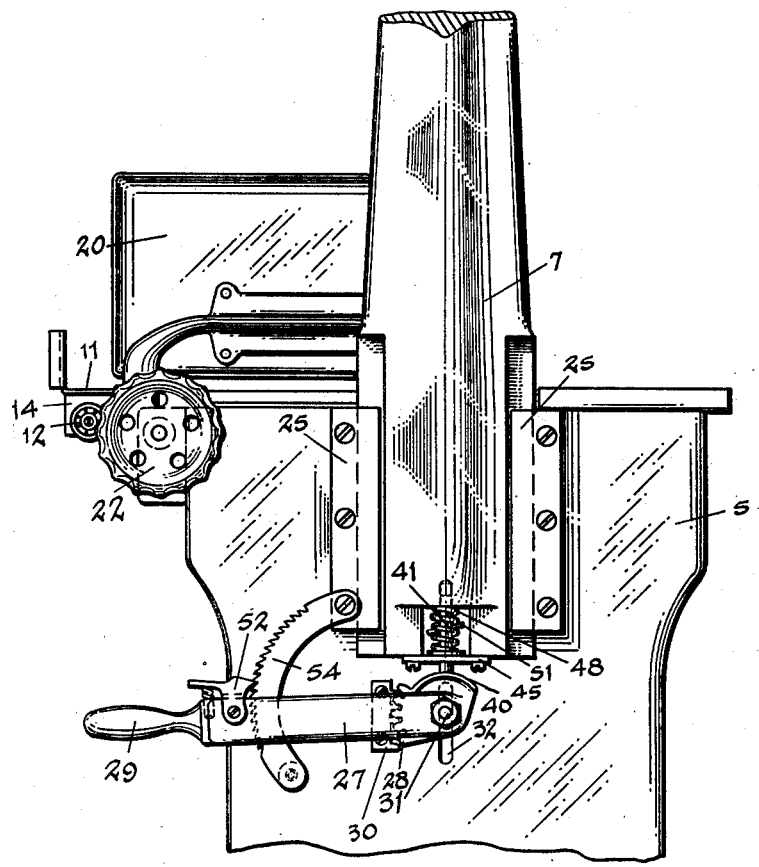
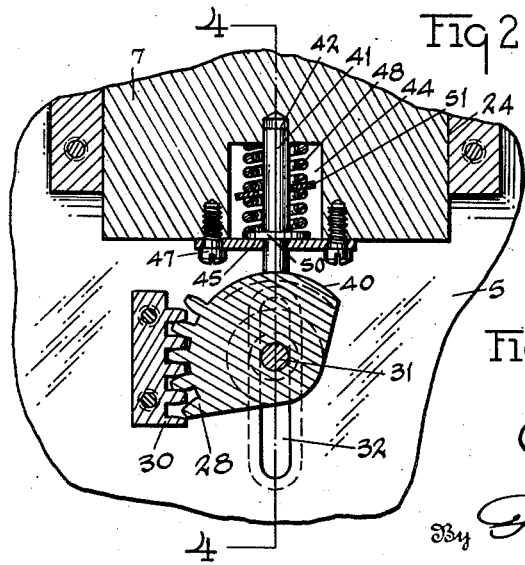
Inventor
Carl G. Biro
Attorney Patented Jan. 4, 1938

2,104,360

UNITED STATES PATENT OFFICE 2,104,360

MEAT CUTTING AND SLICING MACHINE

Carl G. Biro, Marblehead, Ohio

Original application February 27, 1936, Serial No. 66,071. Divided and this application January 28, 1937, Serial No. 122,824

2 Claims. (Cl. 143—27)

My invention has for its object to provide in a band saw meat cutting machine an efficient means for readily tightening and adjusting the band saw to an exact degree of tautness. In band saw slicing machines the variation of tension of the band saw greatly varies the efficiency of the machine. If the band saw is slightly overtaut, the increased rigidity produced tends to cause sharp bending when the saw passes through meat portions and strikes the bone, and the rigidity and movement of the saw often causes the saw to break. If, on the other hand, the tautness is below a certain degree the pressure of the saw against the bone causes the band saw to be displaced with reference to the surface of the wheels toward the flange and upon release of the saw from the bone in the sawing operation, the saw often elastically snaps from the wheels which frequently results in injury to the operator. The invention particularly provides a means whereby the band saw may be readily adjusted by the user of the machine.

In the operation of the machine, particles of the meat cling to the band saw. The heat of the band saw, caused particularly by the friction of the saw through the bone, causes the mixture of the particles of marrow and bone that collect on the surfaces of the saw and the wheels to form a hardened glassy coating that not only reduces the efficiency of operation of the machine, but also produces an unsanitary condition in the various parts of the machine. It is, therefore, necessary to frequently clean the meat particles gathered on different parts of the machine not only for sanitation, but also to produce operating efficiency. In order to clean these parts, it is necessary to remove the band saw and replace the band saw after the parts have been cleaned. My invention provides a structure so formed that the time required of the user to remove the objectionable material and reassemble the parts of the machine is greatly reduced. By the use of my invention, the band saw may be readily loosened and removed to enable cleaning and easily restored to the exact degree of tautness to produce efficient operation.

Structures containing the invention may partake of different forms and may be varied in their details and still embody the invention. To illustrate a practical application of the invention, I have selected a meat cutting and slicing machine as an example of the various structures that contain the invention and shall describe the selected structure hereinafter. The particular structure selected is shown in the accompanying drawings.

This application is a divisional application of application No. 66,071 for Meat cutting and slicing machine filed February 27, 1936, now Patent No. 2,081,033 issued May 18, 1937.

Fig. 1 illustrates a side view of the sawing machine. Fig. 2 illustrates an end view of a part of the machine. Fig. 3 illustrates a vertical section of the machine taken on the plane of the line 3—3 indicated in Fig. 1. Fig. 4 illustrates a view of a vertical section taken on the plane of the line 4—4 indicated in Fig. 3.

In the particular form of construction shown in the drawings, a band saw 1 is disposed on a pair of wheels 2 and 4. The parts of the machine are supported on a frame comprising the base 5. The wheel 2 is supported on a standard 7 and located in a suitable housing 8 formed on the upper end of the standard 7. The housing may be closed by a suitable cover plate 10 to enclose the wheel 2. The wheel 4 is mounted in the base 5 and is connected to a suitable motor for driving the band saw.

During the sawing operation the meat is located upon a plate 11 that is provided with rollers 12 rotatably connected to depending brackets 14 and movable in channeled members 15 supported on the base 5 of the machine and on brackets 17 connected to the base. The plate 11 is provided with an upturned forward end part 18 to provide a vertical surface for pressing the meat against the saw when the plate is moved in a direction transverse to the band saw 1.

During the slicing operation the meat may be shifted over the plate upon completion of each cut. To regulate the thickness of the slices an adjustable plate 20 may be disposed to limit the shifting of the meat between each cutting operation. The plate 20 may be adjusted by a suitable screw, such as the screw 21, that may be operated by a handle or hand wheel 22 to rotate the screw and adjust the plate 20 with reference to the band saw 1 whereby thickness of the slice may be varied as may be desired.

To enable removal of the band saw, the standard 7 is slidably supported in ways 24 formed by strips 25 secured to the base 5 of the machine. The standard 7 is guided by the ways 24 when lowered or raised. When the standard 7 is lowered, the band saw may be readily slipped from the surface of the wheels 2 and 4. When the saw is to be replaced, it is positioned on the wheels 2 and 4, and the standard is raised to such a point as to produce the desired tension in the saw.

In the form of construction shown, the standard 7 is raised by means of a lever 27 having a sector gear 28. A handle 29 may be provided for rotation of the lever. The sector gear meshes with the gear rack 30 secured to an end of the base 5 and raises the end of the lever when the sector gear and the lever are rotated. The lever 27 is provided with a pin 31 that is centrally located with respect to the sector gear 28. The pin extends through a slot 32 formed in the end wall of the base 5. The pin 31 may be in the form of a bolt having a flat head 34 located in a recessed part 35 formed in the inside surface of the base 5 of the machine. The recess and the slot are covered by a plate 37 that is secured to the end wall of the base by means of the stud bolts 38. The head 34 of the pin is broad and flat and operates to vertically guide the end of the lever parallel to the line of centers of the teeth of the rack, as the consecutive teeth of the sector engage the consecutive teeth of the gear rack 30.

The end of the lever 27 is provided with a curved surface 40 which is preferably cylindrical in form and is coaxially located with respect to the pin 31 and the sector gear 28. The standard 7 is provided with an end part that engages the surface 40 whereby the lever 27 will operate to vertically raise the standard 7 as the curved surface 40 slides under the end part of the standard.

In the form of construction shown, a rod 41 is located in a bore 42 that extends through a relatively large opening 44 formed in the lower end of the standard and also through a plate 45 secured to the lower end of the standard by the machine screws 47. The lower end of the rod 41 engages the cylindrical surface 40 of the lever 27. A relatively stiff spring 48 is located in the opening 44, and one end engages the standard, while the other end engages the plate 45. The rod 41 is provided with a shoulder or washer 50 that is secured to the rod, and the lower end of the spring engages the washer to receive the thrust of the rod. When the standard 7 is raised by operation of the lever 27, the tension of the band saw is progressively increased which progressively produces deformation of the spring 48. When the pressure of the spring 48 reaches substantially a predetermined degree, the turns are located at predetermined distances apart. A split ring or a slotted sheet metal member 51 of a certain thickness may be located between two consecutive turns of the spring and formed to have a thickness such that when the band saw is overtaut, the turns will tighten against the surface of the member 51. The pressure of the spring 48 may then be reduced until the member 51 can be manually shifted between the turns. Thus, the member 51 may be designed so as to indicate to the user of the machine when the lever 27 has been manipulated sufficiently to produce the required tautness of the band.

In order to secure the lever 27 in its adjusted position, a suitable spring pressed dog 52 may be pivotally supported on the lever 27, and a ratchet 54 may be located on the base 5 to be engaged by the dog 52 at any one of a number of teeth formed on the ratchet 54. Thus, the dog 52 will operate to hold the standard 7 and maintain the tautness as determined by the movement of the standard by the lever 27.

In the care of the machine the standard 7, together with the wheel 8, may be readily lowered and the band saw removed from the wheels and the surface of the wheels cleaned and also the surface of the band saw may be cleaned whereupon the band saw may be replaced on the wheels and the lever 27 manipulated to raise the standard 7 and produce, by adjustment, the tension on the saw that will cause the consecutive turns of the spring 48 to be located in the same spaced relation in which they were located before disassembly of the band saw, as determined by the resistance to movement of the member 51 between any two of the consecutive turns of the spring 48.

I claim:

1. In a sawing machine, a band saw, a pair of wheels for supporting the band saw, means for rotating one of the wheels to move the saw over the wheels, a base, a member movably supported on the base, one of the wheels rotatably supported in the base, and the other of the wheels rotatably supported on the member, a spring pressed rod supported on the member, a lever having a cylindrical surface for engaging the spring pressed rod to resiliently move the member and vary the tension of the band saw, the lever having gear teeth located arcuately and concentric with the said cylindrical surface, a rack, the centers of the teeth of the rack extending in a direction parallel to the direction in which the member is movable relative to the base, and a bearing pin for rotatably supporting the lever and movable therewith for guiding the cylindrical surface to maintain meshing relation between the teeth of the lever and the teeth of the rack.

2. In a sawing machine, a band saw, a pair of wheels for supporting the band saw, means for rotating one of the wheels to move the saw over the wheels, a base, a member movably supported on the base, one of the wheels rotatably supported in the base and the other of the wheels rotatably supported on the member, a spring-pressed rod supported on the member, a lever having a cylindrical surface for engaging and supporting the end of the spring-pressed rod to resiliently move the member and vary the tension of the band saw, the lever having gear teeth located arcuately and concentric with the said cylindrical surface, a rack, the centers of the teeth of the rack extending in a direction parallel to the direction in which the member is movable relative to the base, the base having a slot extending parallel to the rack and a bearing pin for rotatably supporting the lever and extending through the slot and projecting at right angles to the direction in which the pin extends for guiding the cylindrical surface as it is raised to maintain meshing relation between the teeth of the lever and the teeth of the rack and support the pin.

CARL G. BIRO.